United States Patent [19]

Maifredi

[11] Patent Number: 5,167,431
[45] Date of Patent: Dec. 1, 1992

[54] INSERT FOR CONNECTING A FLEXIBLE TUBE TO A SHOWER HEAD

[75] Inventor: Oscar Maifredi, Castel Goffredo, Italy

[73] Assignee: Solid Plast S.r.l., Brescia, Italy

[21] Appl. No.: 636,767

[22] Filed: Jan. 2, 1991

[30] Foreign Application Priority Data

Apr. 27, 1990 [IT] Italy ................................. 5160 A/90

[51] Int. Cl.$^5$ .............................................. F16L 37/00
[52] U.S. Cl. ........................................ 285/319; 285/8;
285/243; 285/374; 285/399
[58] Field of Search .................... 285/8, 319, 374, 243, 285/322, 399

[56] References Cited

U.S. PATENT DOCUMENTS

| 2,915,325 | 4/1954 | Foster | 285/319 X |
| 3,055,392 | 12/1959 | Barotz | 285/8 X |
| 3,227,380 | 2/1963 | Pinkston | 285/8 X |
| 4,887,849 | 12/1989 | Briet | 285/319 X |

*Primary Examiner*—Randolph A. Reese
*Assistant Examiner*—Timothy Aberle
*Attorney, Agent, or Firm*—McGlew & Tuttle

[57] ABSTRACT

The invention relates to an insert for connecting a flexible tube to a shower head which has an axial pipe (13) and, externally, has keying (17) and sealed truing (15, 16) structure in a seat of said shower head. It has one elastic tab (19) with a tooth (20) able to clip into a hole (21') formed at the same level of said seat. The keying structure (17) prevents the rotation of the insert while the tooth prevents an axial unscrewing.

7 Claims, 2 Drawing Sheets 5,167,431

INSERT FOR CONNECTING A FLEXIBLE TUBE TO A SHOWER HEAD

FIELD OF THE INVENTION

The present invention relates to manual shower heads and in particular to an insert for connecting a flexible tube to the end of the shower heads.

BACKGROUND OF THE INVENTION

The connection between a shower head and the appropriate flexible tube for the carrying of the water is usually achieved by using a nipple interagent with a screwed ring or ring nut fitted to the end of the flexible tube.

In accordance with known techniques, the nipple can be machined so as to form a single unit with the shower head or it can be made up of metal, such as brass fitted and held either at the end of said shower head or with a stay bolt which stretches to the head of the shower.

The shower head is usually moulded in plastic material. Therefore, the thickness of the sides have to be as equal as possible so as not to cause problems or defects due to different shrinkage of the different portions of the shower head. From this point of view, due to pressure and technical reasons, differentiated thicknesses are caused when the nipple is integrated to the shower head. This can negatively affect the proper functioning of the shower head. On the other hand, the assembly and fixing of the covering of the insert inside the shower head is not without its problems.

SUMMARY AND OBJECTS OF THE INVENTION

The object of this invention is to make the application of an insert to the above mentioned type of shower head simpler, therefore achieving both an axial and radial fixage between the two associated components which is secure and reliable.

The insert here proposed is fitted with sealed keying and truing means at the end of the shower head, as well as at least one elastic tab with a tooth able to clip into a corresponding hole cut into the side of the shower head so as to obtain an axial lock of the insert.

The insert, therefore, clips into the shower head with a quick and simple movement which can be carried out without the use of special tools and with the possibility of separating this insert from the shower head when necessary. The insert can be advantageously moulded in plastics and can be tinted in any color, even different to that of the shower head, so as to chromatically match it to the bored disc or discs at the head of the shower for a more attractive effect which is commercially requested.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENTS

Figure 1:
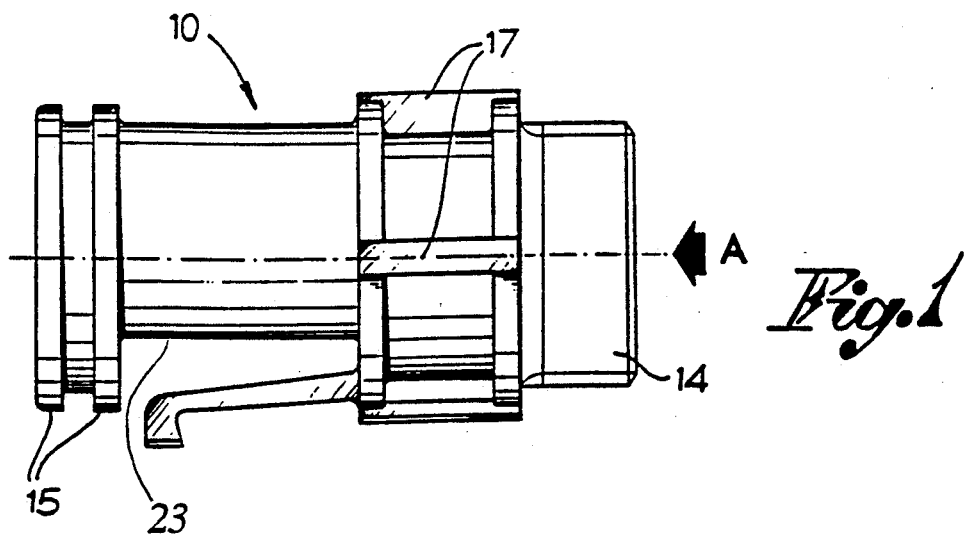
FIG. 1 is an enlarged side view of the insert.
Figure 2:
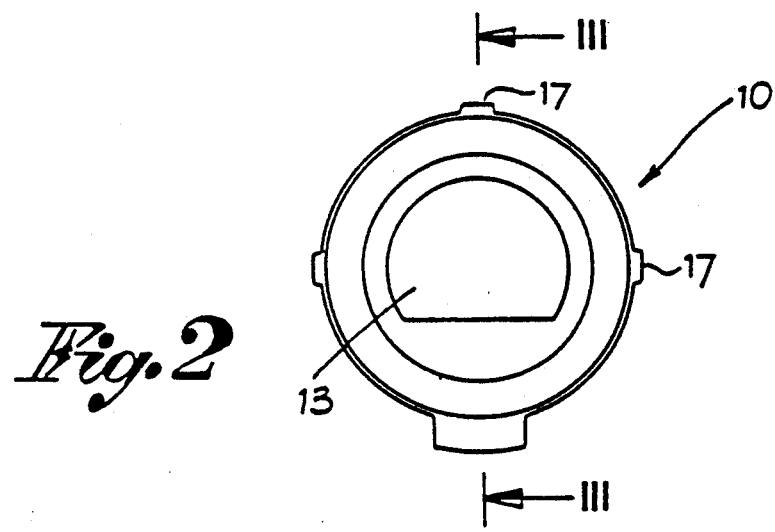
FIG. 2 is the back view of the insert on the arrow (A) in FIG. 1.
Figure 3:
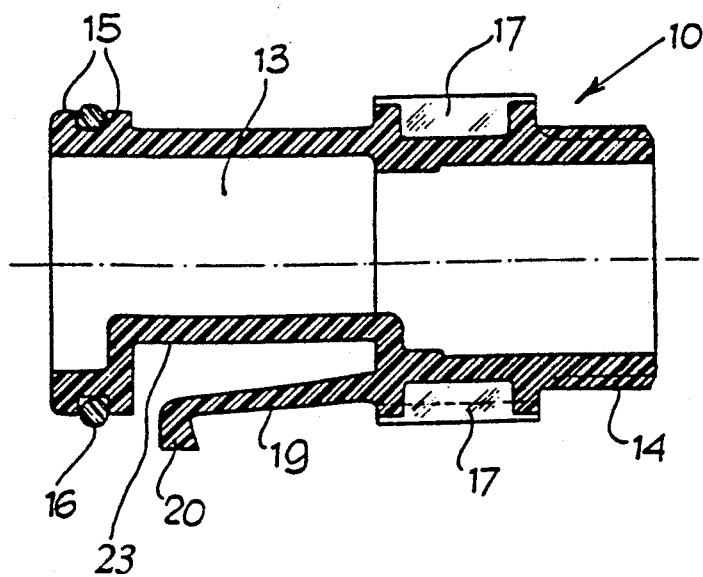
FIG. 3 is an axial section view of the insert on the arrows III—III in FIG. 2.
Figure 4:
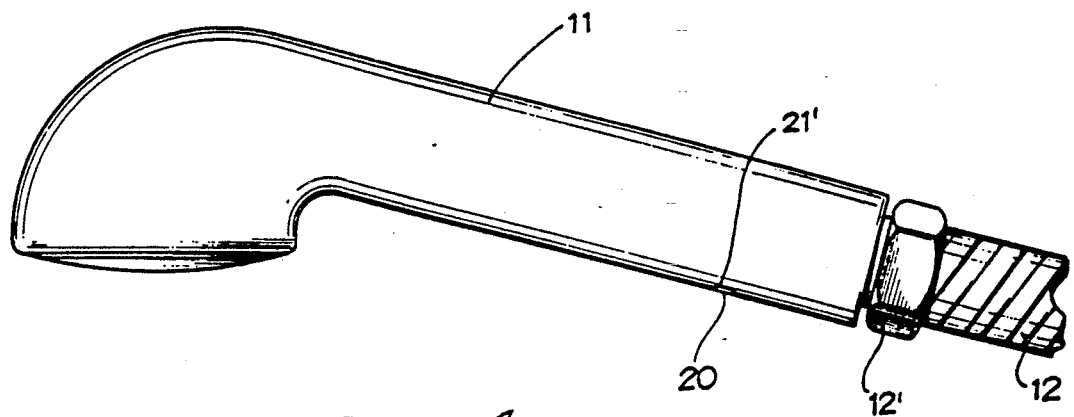
FIG. 4 is a side view of the shower fitted with an insert.

The proposed insert (10) is fitted to a shower head or receiving pipe (11) so as to connect a flexible tube (12) to its end.

The shower head (11) is realized through conventional techniques and suitable shapes, and the insert (10) is moulded in a dyeable plastic material of any color and is fitted to the end of the shower head.

To be more precise, the insert has a general cylindrical configuration and has an axial pipe (13) which allows the water to pass from the flexible tube towards the shower head. A threaded area (14) is formed into one end of the insert (10) to which the flexible tube (12) is fitted through the use of a lock nut (12'). A sealing means at the opposite end of the threaded area 14 is created by a pair of external peripheral collars (15), between which a toric gasket (O-ring), (16) is placed, and designed to rest against and seal the internal surface of the shower head.

Key type ribs (17) which extend along the insert (10) and which are set in corresponding grooves (18) formed into the shower head when the insert is fitted to it, are cut into a part of the periphery of the insert.

At least one elastic tab (19), integral on one end of the insert (10) and having a hooking tooth (20) on the other end is also formed into the periphery of the insert. When the tab (19) is stationary, its tooth (20) radially protrudes from the outline of the insert (10) whilst the tab is elastically loaded when the insert is fitted into the shower head (11). A radially inwardly offset cylindrical center portion 23 is defined between collars 15 and the one end of elastic tab 19.

The shower head (11) has a seat (21) at the end designed to be fitted with the insert and at least one hook hole (21') is cut at the same level, next to which a sloped raiser plane (22) is forseen towards the end of said shower head.

In practice, the insert (10), fitted with a seal (16), is set into the shower head (11), (FIG. 5) so that the external ribs or keys (17) fit the grooves (18) in said head, and the tooth (20) of the elastic tab (19) clips into the hook hole (21') of the head (11) which is favored by the presence of the sloped plane (22).

The insert (10) results in being keyed into the shower head and cannot rotate or axially withdraw. In fact, the external ribs or keys (17) fitted into the grooves (18) prevent the rotation of the insert even if forced in the direction of screwing or unscrewing of the nut of the flexible tube, whilst the hooking tooth (20) assures an axial stoppage of the insert.

Figure 5:
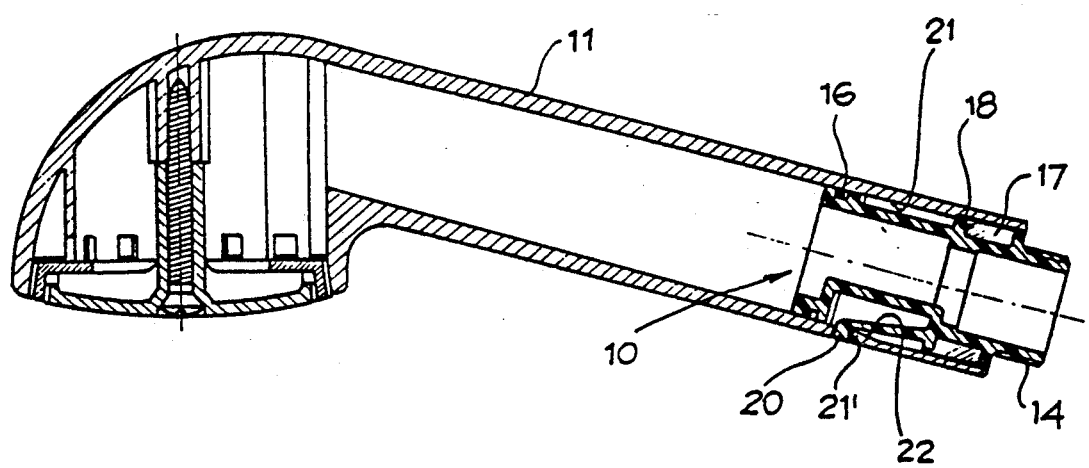
FIG. 5 is a longitudinal section view of the shower in FIG. 4.

Meanwhile, the seal (16) engages on the internal surface of the seat (21) so as to seal the connection. The seal is placed further inside the shower head with respect to the hook position of the hole (21') which is designed to hold the hooking tooth as shown in FIG. 5 of the drawing.

While a specific embodiment of the invention has been shown and described in detail to illustrate the application of the principles of the invention, it will be understood that the invention may be embodied otherwise without departing from such principles.

I claim:

1. A pipe connection comprising:

an axial pipe having a first and second end, and an inside for passing fluids, said axial pipe having a center portion between said first and second ends, said center portion having a cross sectional area less than a cross sectional area of said first end, and said center portion cross section area being offset from a center of said first end cross sectional area;

sealing means on an outside first end of said axial pipe;

a hooking tooth attached to an outside of said axial pipe at said center portion and at a spaced distance away from said outside first end of said axial pipe and toward said second end, said hooking tooth having an elastic tab connecting said hooking tooth to said outside of said axial pipe, said elastic tab biases said hooking tooth, said elastic tab and said hooking tooth positioned offset from said center of said first end cross sectional area, said elastic tab and said hooking tooth being substantially opposite said center portion cross sectional area;

a receiving pipe having an inside and an outside, said inside of said receiving pipe having a seat cooperating with said sealing means, said receiving pipe also defining a hook hole cooperating with said hooking tooth, said hook hole extending over a fractional circumferential length of said receiving pipe, said receiving pipe also having a sloped plane adjacent said hook hole, said sealing means being inserted into said receiving pipe further than said hook hole.

2. A pipe connection in accordance with claim 1, further comprising:

rib and groove means on said axial pipe and said receiving pipe for preventing rotation of said axial pipe with respect to said receiving pipe.

3. A pipe connection in accordance with claim 1, wherein:

said elastic tab is integral with said axial pipe and said elastic tab protrudes said hooking tooth from an outline of said axial pipe.

4. A pipe connection in accordance with claim 1, wherein:

said sealing means has two collars and a gasket fitted between said two collars.

5. A pipe connection in accordance with claim 1, wherein:

said second end of said axial pipe is threaded and said sealing means is inserted into said receiving pipe further than said hook hole.

6. A pipe connection in accordance with claim 1, wherein:

said axial pipe is of a material dyeable into any color.

7. A pipe connection in accordance with claim 1, wherein:

said elastic tab and said hooking tooth are completely outside of said axial pipe and on a non-fluid side of said sealing means.

* * * * *